United States Patent
Abdur-Rahim et al.

(10) Patent No.: US 8,933,572 B1
(45) Date of Patent: Jan. 13, 2015

(54) ADAPTIVE SUPERCONDUCTIVE MAGNETIC ENERGY STORAGE (SMES) CONTROL METHOD AND SYSTEM

(71) Applicant: King Fahd University of Petroleum and Minerals, Dhahran (SA)

(72) Inventors: Abu Hamed Abdur-Rahim, Dhahran (SA); Muhammad Haris Khan, Karachi (PK)

(73) Assignee: King Fahd University of Petroleum and Minerals, Dhahran (SA)

( * ) Notice: Subject to any disclaimer, the term of this patent is extended or adjusted under 35 U.S.C. 154(b) by 1 day.

(21) Appl. No.: 14/018,314

(22) Filed: Sep. 4, 2013

(51) Int. Cl.
| | |
|---|---|
| F03D 9/00 | (2006.01) |
| H02P 9/04 | (2006.01) |
| H02P 9/00 | (2006.01) |
| F03D 7/00 | (2006.01) |

(52) U.S. Cl.
CPC .. H02P 9/00 (2013.01); F03D 7/00 (2013.01); H02P 2009/004 (2013.01)
USPC .............................................. 290/44; 290/55

(58) Field of Classification Search
USPC .................................................... 290/44, 55
See application file for complete search history.

(56) References Cited

U.S. PATENT DOCUMENTS

| | | | |
|---|---|---|---|
| 8,275,488 B2 | 9/2012 | Kim et al. ..................... 700/287 |
| 8,311,863 B1 * | 11/2012 | Kemp ......................... 705/7.11 |
| 8,626,350 B2 * | 1/2014 | Al-Hamouz et al. ......... 700/287 |
| 2004/0044442 A1 * | 3/2004 | Bayoumi et al. .............. 700/286 |
| 2010/0268395 A1 | 10/2010 | Ingemann et al. ............ 700/289 |
| 2011/0257799 A1 * | 10/2011 | Al-Hamouz et al. ......... 700/287 |
| 2011/0257800 A1 * | 10/2011 | Al-Hamouz et al. ......... 700/287 |
| 2012/0217824 A1 | 8/2012 | Gupta et al. .................. 307/145 |
| 2012/0259477 A1 | 10/2012 | Abido et al. .................. 700/297 |
| 2013/0024042 A1 | 1/2013 | Asghari et al. ............... 700/295 |
| 2014/0113828 A1 * | 4/2014 | Gilbert et al. ................. 505/100 |

\* cited by examiner

*Primary Examiner* — Pedro J Cuevas
(74) *Attorney, Agent, or Firm* — Richard C. Litman

(57) ABSTRACT

The adaptive superconductive magnetic energy storage (SMES) control method and system control a SMES device connected to a power generation system. A radial basis function neural network (RBFNN) connected to the controller adaptively adjusts gain constants of the controller. A processor executes an improved particle swarm optimization (IPSO) procedure to train the RBFNN from input-output training data created by the IPSO, and thereafter generate starting weights for the neural network. Tests carried out show that the proposed adaptive SMES controller maintains the DC capacitor voltage constant, thus improving the efficiency of wind energy transfer. The power output (reactive and real) of the SMES device improves the voltage profile following large voltage dips and provides added damping to the system.

16 Claims, 14 Drawing Sheets

US 8,933,572 B1

ADAPTIVE SUPERCONDUCTIVE MAGNETIC ENERGY STORAGE (SMES) CONTROL METHOD AND SYSTEM

BACKGROUND OF THE INVENTION

1. Field of the Invention

The present invention relates to energy storage devices, and particularly to an adaptive superconductive magnetic energy storage (SMES) control method and system.

2. Description of the Related Art

Because of diminishing oil reserves and environmental concerns, renewable energy research is gaining momentum. Wind energy in itself encompasses various engineering fields and is rapidly developing into a multi-disciplinary area of research and experimentation. In wind generation systems, the variable speed, doubly fed induction generator (DFIG) is preferred over the permanent magnet synchronous generator (PMSG) for its versatility. Background details on the various wind turbine systems may be found in U.S. patent Publication Ser. No. 13/862,327, filed on Apr. 12, 2013, which is incorporated by reference in its entirety herein. The '327 patent application and the present patent application have a common inventor, Abu Hamed Abdur-Rahim.

The control of energy storage devices fed by the aforementioned wind turbines is necessary, since by controlling the energy storage device, power that flows to the grid can be adjusted. The system dynamics relied upon in some installations use a PI (proportional-integral) controller. Many installations use Fuzzy logic to find the energy storage device controller parameters. A self-tuning fuzzy PID (proportional-integral-derivative) controller has been described in the related art. Robust controllers for output power leveling of energy storage systems are also available in the literature. The use of generalized predictive control has also been reported. Moreover, the literature reports a neural network capable of self-tuning for different operating conditions.

An energy storage device gaining increasing popularity is the superconductive magnetic energy storage (SMES) device. The SMES is a device that can deliver both real and reactive power, and hence provides good damping to a PMSG system.

SMES has found widespread application in power systems. However, studies on application of this powerful energy storage device in PMSG wind generator systems are virtually missing. Because of the erratic nature of wind speed variations, this storage device, which can compensate for both real and reactive power, is expected to be a useful control tool.

Wind turbulence and grid faults are the main concerns in a PMSG wind turbine system. Because of them, systems are not able to meet the active and reactive power demand during these faults. Energy storage devices may improve wind system performance by providing active power to the system at the time of contingencies. Variable speed wind generators integrated with an energy storage system are getting attention in recent times.

Thus, an adaptive superconductive magnetic energy storage (SMES) control method and system solving the aforementioned problems is desired.

SUMMARY OF THE INVENTION

The adaptive superconductive magnetic energy storage (SMES) control method and system involves generating starting weights for a neural network by training the network from input-output data created by an improved particle swarm optimization (IPSO) procedure. Tests carried out show that the proposed adaptive SMES controller maintains the DC capacitor voltage constant, thus improving the efficiency of wind energy transfer. The power output (reactive and real) of the SMES improves the voltage profile following large voltage dips, and at the same time, provides added damping to the system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions, but excludes intangible media or transient waveforms or signals.

Figure 2:
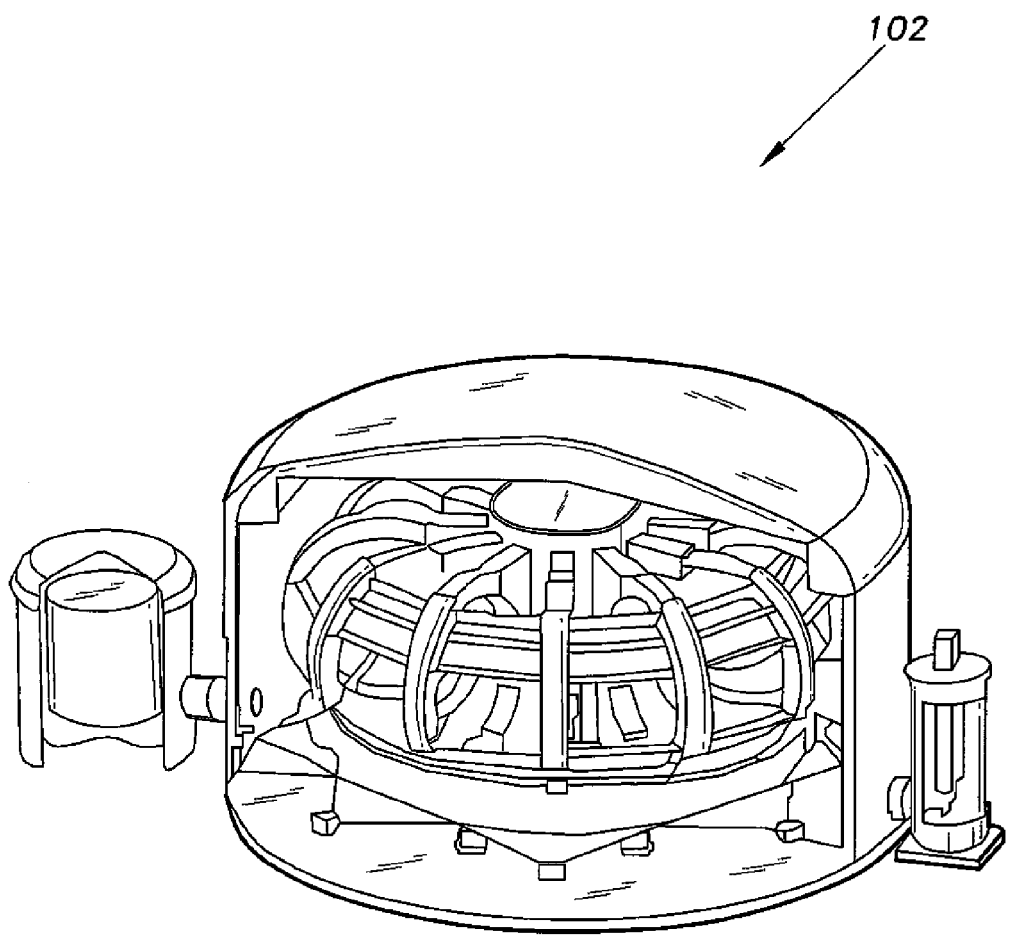
FIG. 2 is a perspective view of a superconductive magnetic energy storage (SMES) device.

A superconducting magnetic energy storage (SMES) device stores energy in the form of a magnetic field, which is generated by the flow of DC current in a coil. This coil is cryogenically cooled. This technology has been used to improve the power quality of the industries. SMES technology uses a superconducting coil, which is virtually free from electrical resistance. If a SMES were to use conventional wire, such as copper, at non-superconducting temperatures, the magnetic energy would be dissipated as heat due to the wire's resistance to the flow of current. An exemplary SMES device 102 is shown in FIG. 2. Although superconductivity was discovered in 1911, SMES has been under study for electric utility energy storage application since the early 1970s. Because of the fast response, SMES can provide load-following, system stability, and automatic generation control, can be used as a spinning reserve, or for bulk energy management, dynamic voltage stability, tie line control, power quality improvement, a backup power supply, and minimization of power and voltage fluctuations of a wind generator. The other major advantage of SMES is that it can deliver a large amount of energy in a very small duration of time.

Figure 12:
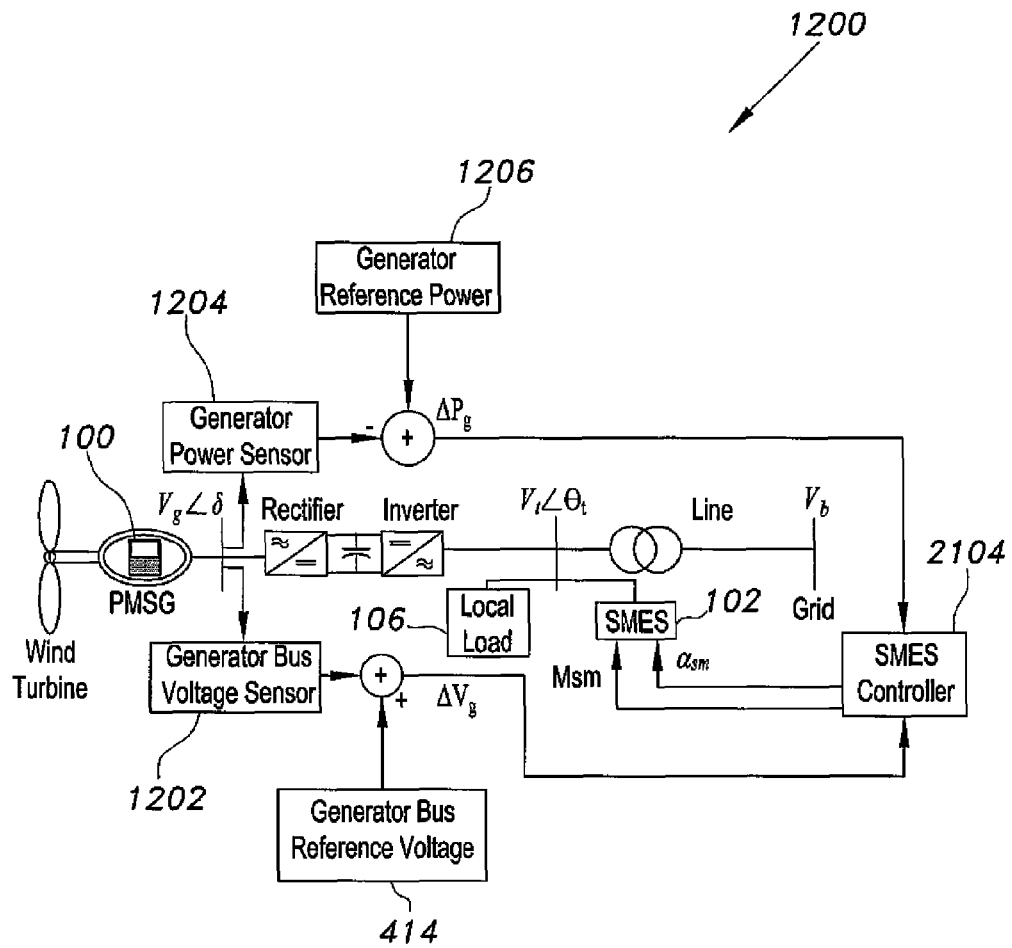
FIG. 12 is a block diagram of a PMSG having an adaptive SMES control system according to the present invention.

In the present system, as shown in FIG. 12, a controller 2104 is connected to control the SMES 102 of a SMES-equipped permanent magnet synchronous generator (PMSG) power generation system 1200. A generator power sensor 1204 output combines with a generator reference power signal 1206, wherein their difference provides a generator power control signal $\Delta P_{PG}$. The output of a generator bus voltage sensor 1202 combines with a generator bus reference voltage 414, wherein their difference provides a generator voltage control signal $\Delta V_G$.

Figure 4:
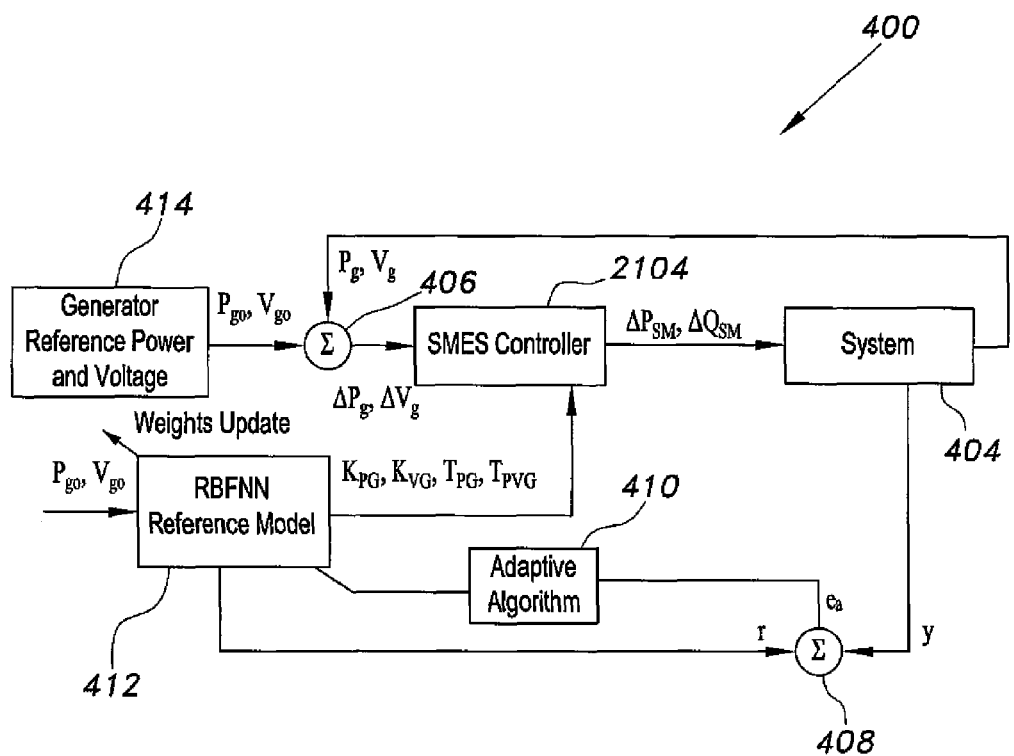
FIG. 4 is a schematic diagram of an adaptive SMES control system according to the present invention.

As shown in FIG. 4, the control methodology 400 includes a radial basis function neural network (RBFNN) 412 connected to the SMES controller 2104 to adaptively adjust gain constants of the SMES controller 2104. A processor running an adaptive algorithm 410 executes an improved particle swarm optimization (IPSO) procedure to train the RBFNN 412 from input-output training data created by the IPSO, and thereafter generates starting weights for the RBFNN 412. As most clearly shown in FIG. 4, a generator reference power and voltage ($P_{go}, V_{go}$) are fed to a summation unit 406.

The SMES-equipped generic power generation system 404 sends a measurement of the actual power and voltage ($P_g, V_g$) to the summation unit 406 so that the summation unit can provide error power and voltage signals ($\Delta P_g, \Delta V_g$) to the input of the SMES controller 2104, which outputs corrective real power and reactive power signals ($\Delta P_{SM}, \Delta Q_{SM}$) to the SMES of system 404. The system 404 outputs a y performance measurement to a second summation unit 408. The y performance measurement is summed with an RBFNN reference parameter, r, to generate an error signal $e_a$, which is fed as an input to the adaptive algorithm 410. This error signal, $e_a$, is used by the RBFNN 412 to update its weights. Once a weight update has been performed by the RBFNN 412, the RBFNN outputs a new set of gain and time constants ($K_{PG}, K_{VG}, T_{PG}, T_{PVG}$) to the SMES controller 2104.

Figure 11:
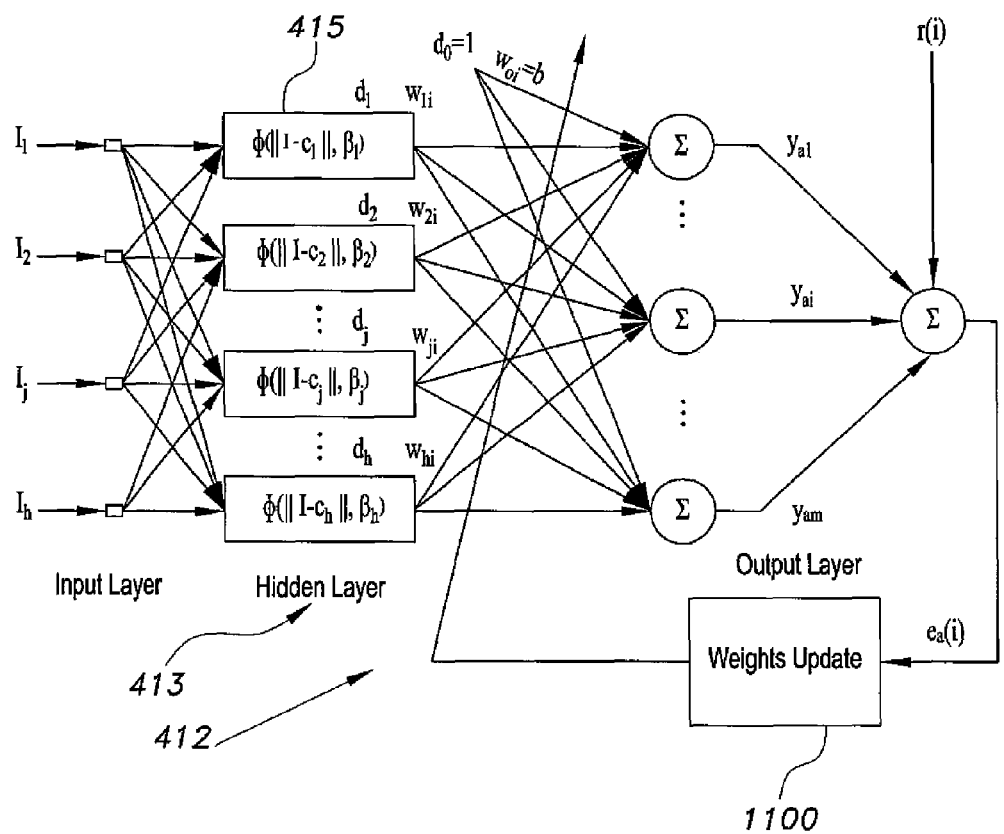
FIG. 11 is a diagram showing the processing of signals by the adaptive RBFNN in an adaptive SMES control system according to the present invention.

As shown in FIG. 11, the structure of the RBFNN 412 includes a plurality of input layer neurons accepting a corresponding plurality of inputs, $I_1, I_2, \ldots, I_j \ldots, I_h$. The input layer then feeds a hidden layer, which, in turn, feeds an output layer. An error $e_a(i)$ between the output $y_a$ and a desired output r(i) is fed to a weights updater 1100, which adaptively updates weights of the RBFN 412 to minimize the error $e_a(i)$. The RBFNN 412 is used to tune the parameters of the SMES controller to keep the system stable in case of any disturbance, and it is adjusted according to the error between the input and output in its loop. The aim of the adaptive strategy is to make the SMES controller a more powerful reference to different contingencies or different loading conditions. In case of disturbance, the adaptive SMES controller, based on the RBFNN, will take effect more successfully. This approach not only ensures the power generation system performance and robustness of the system, but also improves online tuning for the SMES controller parameters at different contingencies.

Recently, the RBFNN has been widely used to model and approximate non-linear functions. Here a RBFNN is employed to model the relationship between the input variable, $I_p$, and the system control, u. The weightings between hidden layer neurons and output layer neurons are adjusted based on an adaptive rule. In the present method, an RBFNN-based controller 412 is proposed by an adaptive rule. The control input of the RBFNN controller 412 is:

$$u = \sum_{j=1}^{N} w_j \exp\left(\frac{-\|I - c_j\|^2}{\beta_j^2}\right). \tag{1}$$

The adaptive rule is used to adjust the weightings for searching the optimal weighting values and obtaining the stable convergence property. The adaptive rule is derived from the steepest descent rule to minimize the value of $e_a$ with respect to $w_j$. Then, the updated equation of the weighting parameters is:

$$w_{jnew} = w_{jold} + w_j(t+1), \tag{2}$$

where $w_j$ (t+1) is the predicted value of the weight vector, $w_{jold}$ is the present value of the weight vector, and $w_{jnew}$ is the new value of the weight vector. Also, $$w_j(t+1) = -\eta \frac{\partial (e_a(t))^2}{\partial w_j(t)} \tag{3}$$

and $$e_a(t) = r(t) - y(t) \tag{4}$$

where r(t) is the summation of the output of the RBFNN model, y(t) is the output generated by the system, k=1, 2, 3 ... m; and $\eta$ is the regulation factor. The error $e_a$ is a linear difference between r and y used to update the weights vector.

Based on the chain rule, equation (3) can be rewritten as:

$$w_j(t+1) = -\eta \frac{\partial (e_a(t))^2}{\partial u(t)} \frac{\partial u(t)}{\partial w_j(t)} = \rho e_a(t) \frac{\partial u(t)}{\partial w_j(t)} \tag{5}$$

$$w_j(t+1) = \rho e_a(t) \exp\left(\frac{-\|x - c_j\|^2}{\beta_j^2}\right) = \rho e_a(t) \phi_j \tag{6}$$

where $\rho$ is the learning rate parameter. The overall weights of the network which will be updated by using an adaptive RBFNN algorithm are:

$$w_{1new} = w_{1old} + w_1(t+1) \tag{7}$$

$$w_{mnew} = w_{mold} + w_m(t+1). \tag{8}$$

The adaptive control scheme, as presented in FIG. 4, utilizes an adaptive strategy, which is used to extract adaptive SMES controller parameters in different contingencies. The input vector contains generator current, generator angle, generator speed, DC-link capacitor voltage, the inverter current, generator power, and terminal voltage. This data set is used as input to the RBFNN for training. The output data set contains SMES controller parameters ($K_{pg}$, $K_{vg}$, $T_{pg}$ and $T_{vg}$), which are obtained by applying the IPSO algorithm. When the network is trained, the weight vector of the RBFNN is fixed. The present algorithm uses the RBFNN trained network as a reference model.

As shown in FIG. 4, the SMES controller provides the appropriate signal of $\Delta P_{SM}$ and $\Delta Q_{SM}$ to the system to compensate the power. In order to calculate the adaptive parameters of the SMES controller, the adaptive RBFNN output, $y_a$, should be driven to as close as possible to the desired output r specified by the reference model. The error, $e_a(t)$, between the reference model and the output is generated by the system to adjust the weights of the RBFNN. The adaptive algorithm will allow the weights update between the hidden layer and the output layer using equation (7). When the system faces a disturbance in terms of wind speed change or other type of disturbance, system parameters, such as generator current, generator angle, generator speed, DC-link capacitor voltage, the inverter current, generator power, and terminal voltage, vary according to the disturbance. The reference model generates the new optimum values of $K_{pg}$, $K_{vg}$, $T_{pg}$ and $T_{vg}$. By setting the new values of $K_{pg}$, $K_{vg}$, $T_{pg}$ and $T_{vg}$ as the targets, the predicted value of weights of the adaptive RBFNN is calculated using equations (3)-(6). After updating the weights, new values of SMES controller parameters are applied to the system for calculating the real and the reactive powers of SMES according to the demand.

Figure 1:
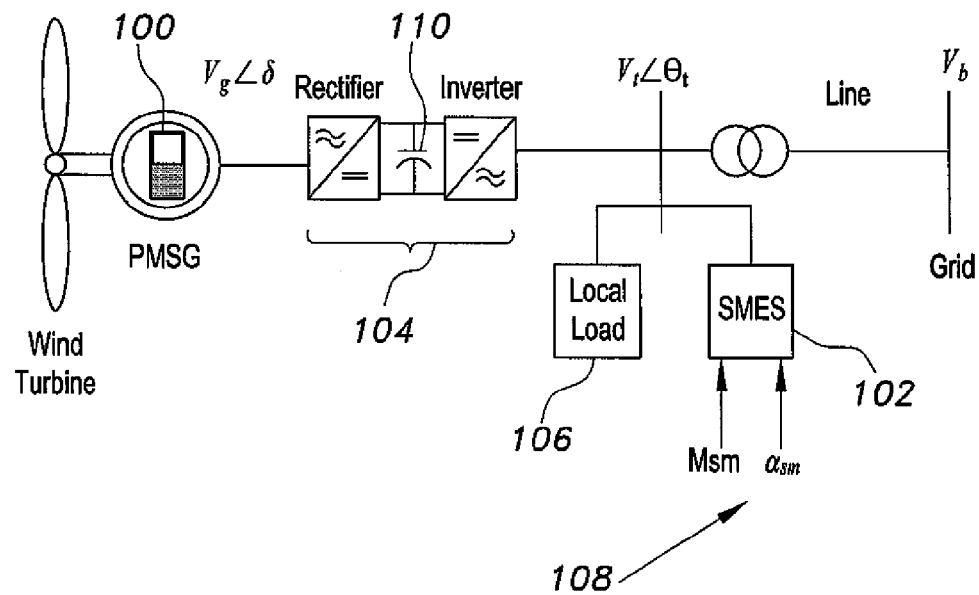
FIG. 1 is a schematic diagram showing an adaptive SMES control system according to the present invention.

As shown in FIG. 1, the permanent magnet synchronous generator (PMSG) 100 is connected to the power grid via a full-scale, back-to-back conversion assembly through a DC link capacitor. It should be understood that the wind turbine shaft is directly coupled to the generator rotor of the PMSG 100. The generator side and the grid side back-to-back converters are connected to each other through a DC link capacitor 110. The superconducting magnetic energy storage (SMES) device 102 is connected at the inverter terminal, along with a local load 106. The inverter terminal is connected to the transmission line through a step-up transformer. The system dynamic model includes PMSG 100, wind turbine, the converters 104, SMES 102, the load, and the transmission line. The SMES controller 2104 takes into account a complex model of the PMSG 100 that includes wind turbine, drive train, and converter power electronics (including DC link capacitor 110, the inverters 104, the SMES 102, and grid side converter currents). The linearized state equation (9) results, as follows:

$$\begin{bmatrix} \Delta \dot{i}_{gd} \\ \Delta \dot{i}_{gq} \\ \Delta \dot{\delta} \\ \Delta \dot{\omega} \\ \Delta \dot{\theta}_z \\ \Delta \dot{\omega}_t \\ \Delta \dot{V}_c \\ \Delta \dot{i}_{id} \\ \Delta \dot{i}_{iq} \\ \Delta \dot{I}_{dc} \\ \Delta \dot{P}_{SM} \\ \Delta \dot{Q}_{SM} \end{bmatrix} = \begin{bmatrix} a_{1,1} & a_{1,2} & a_{1,3} & a_{1,4} & 0 & 0 & a_{1,7} & 0 & 0 & 0 & 0 & 0 \\ a_{2,1} & a_{2,2} & a_{2,3} & a_{2,4} & 0 & 0 & a_{2,7} & 0 & 0 & 0 & 0 & 0 \\ 0 & 0 & 0 & a_{3,4} & 0 & 0 & 0 & 0 & 0 & 0 & 0 & 0 \\ a_{4,1} & a_{4,2} & a_{4,3} & a_{4,4} & a_{4,5} & 0 & a_{4,7} & 0 & 0 & 0 & 0 & 0 \\ 0 & 0 & 0 & a_{5,4} & 0 & a_{5,6} & 0 & 0 & 0 & 0 & 0 & 0 \\ 0 & 0 & 0 & 0 & a_{6,5} & a_{6,6} & 0 & 0 & 0 & 0 & 0 & 0 \\ a_{7,1} & a_{7,2} & a_{7,3} & 0 & 0 & 0 & a_{7,7} & a_{7,8} & a_{7,9} & 0 & 0 & 0 \\ 0 & 0 & 0 & a_{8,4} & 0 & 0 & a_{8,7} & a_{8,8} & a_{8,9} & a_{8,10} & a_{8,11} & a_{8,12} \\ 0 & 0 & 0 & a_{9,4} & 0 & 0 & a_{9,7} & a_{9,8} & a_{9,9} & a_{9,10} & a_{9,11} & a_{9,12} \\ 0 & 0 & 0 & 0 & 0 & 0 & 0 & a_{10,8} & a_{10,9} & a_{10,10} & a_{10,11} & a_{10,12} \\ a_{11,1} & a_{11,2} & a_{11,3} & 0 & 0 & 0 & a_{11,7} & 0 & 0 & 0 & a_{11,11} & 0 \\ 0 & 0 & a_{12,3} & 0 & 0 & 0 & a_{12,7} & 0 & 0 & 0 & 0 & a_{12,12} \end{bmatrix} \begin{bmatrix} \Delta i_{gd} \\ \Delta i_{gq} \\ \Delta \delta \\ \Delta \omega \\ \Delta \theta_z \\ \Delta \omega_t \\ \Delta V_c \\ \Delta i_{id} \\ \Delta i_{iq} \\ \Delta I_{dc} \\ \Delta P_{SM} \\ \Delta Q_{SM} \end{bmatrix} \quad (9)$$

where $\Delta i_{gd}$ is the generator real current (d-axis current), $\Delta d_{gq}$ is the generator quadrature current (q-axis current), $\Delta \delta$ is the generator phase angle, $\Delta \omega$ is the generator speed, $\Delta \theta_z$ is the torsional twist angle of the generator shaft, $\Delta \omega_t$ is the (wind) turbine speed, $\Delta V_c$ is the DC link capacitor voltage, $\Delta i_{id}$ is the inverter side d-axis current, $\Delta i_{iq}$ is the inverter side q-axis current, $\Delta I_{dc}$ is the total DC current available from the SMES to an external AC bus, $\Delta P_{SM}$ is the real power available from the SMES, and $\Delta Q_{SM}$ is the reactive power available from the SMES.

Figure 3:
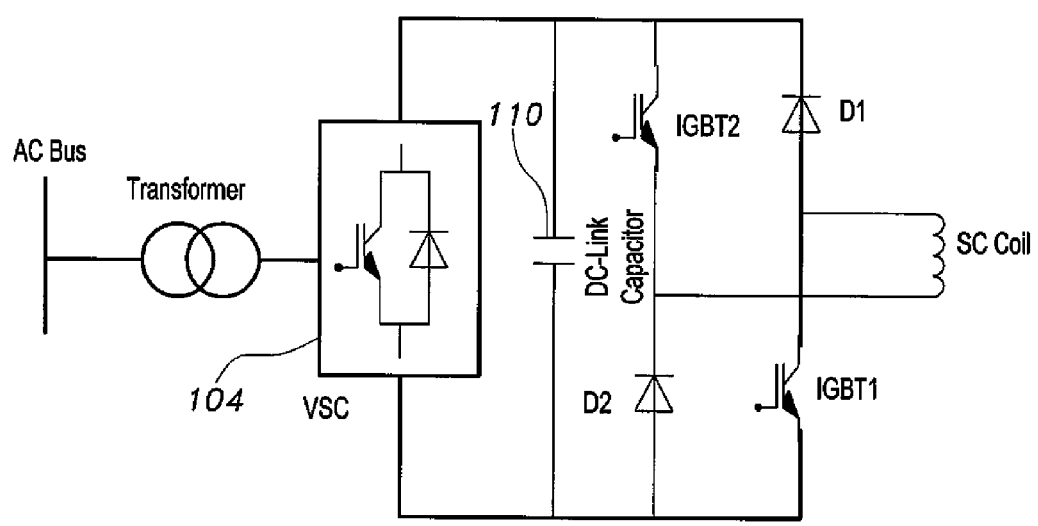
FIG. 3 is a schematic diagram of a SMES and its controller.
Figure 6:
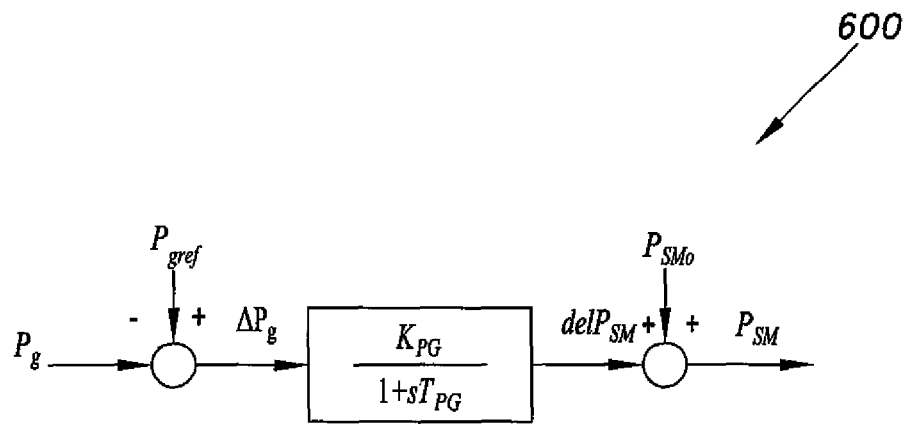
FIG. 6 is a schematic diagram of active power of an adaptive SMES control system according to the present invention.
Figure 7:
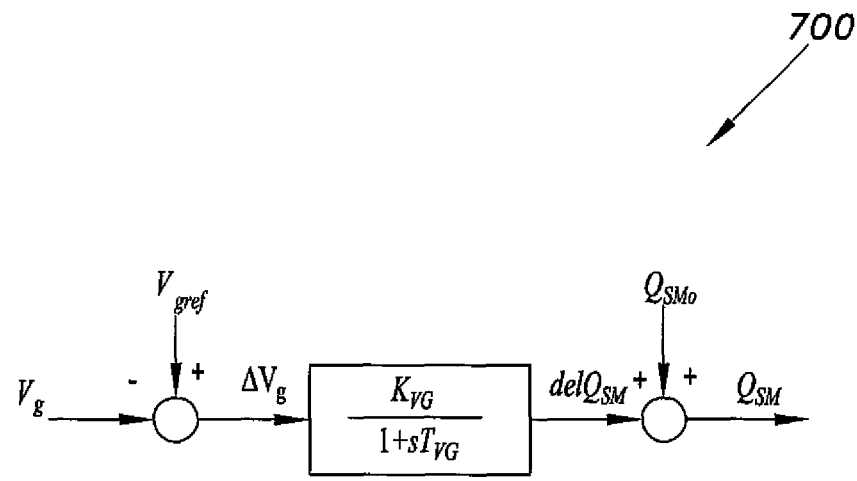
FIG. 7 is a schematic diagram of reactive power of an adaptive SMES control system according to the present invention.

The SMES is capable of supplying both real and reactive power by adjusting the firing angle and the modulation index of its converter. The assumptions made in modeling are: (1) the superconducting coil resistance is zero because of heat dissipation; (2) it has a large inductance because of the high amount of energy storage; (3) the voltage drop in the converter is small; and (4) the harmonic power generated in the converter is also negligible. As shown in FIG. 3, the basic SMES/controller unit circuit includes a superconductive coil (SC) and an AC-to-DC power converter, which is voltage source converter (VSC) 104. DC link capacitor 110 couples the SC coil circuit, comprising a pair of diodes and an insulated gate bipolar transistor (IGBT), to the VSC 104. The voltage source converter 104 converts the DC current of the superconductive coil to AC current compatible with an external AC bus. The power supply can be properly controlled by tuning both the modulation index ($M_{SM}$) and the phase angle ($\alpha_{sm}$) of the VSC 104. The values of the modulation index and the phase angle are computed from the demanded real power and demanded reactive power. The block diagram 600 of FIG. 6 shows active power of the SMES, including gain and the time constant of the active power transfer function. Similarly, the block diagram 700 of FIG. 7 shows the reactive power of the SMES, including the gain and the time constant of the reactive power transfer function. Using the inputs and the real and reactive power outputs and the transfer functions illustrated in FIGS. 6 and 7, $P_{SM}$ and $Q_{SM}$, the VSC modulation index is:

$$M_{SM} = \frac{\sqrt{P_{SM}^2 + Q_{SM}^2}}{V_t I_{dc}}, \quad (10)$$

and $$\alpha_{SM} = \tan^{-1}\left(\frac{Q_{SM}}{P_{SM}}\right). \quad (11)$$

Figure 5:
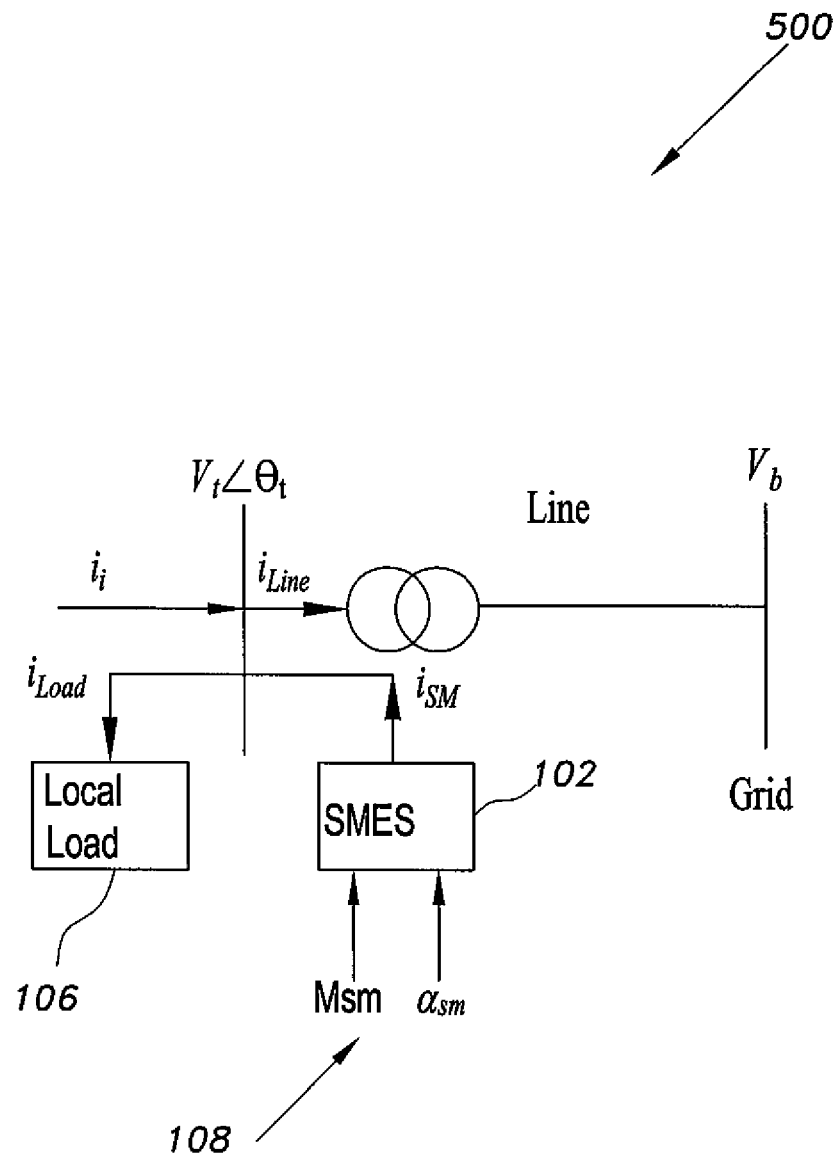
FIG. 5 is a schematic diagram of a SMES on the grid side section of the system.

The complete system model, written as:

$$\dot{X} = f[x, u], \quad (12)$$

is extracted from the complex model of the PMSG 100 that includes the wind turbine, drive train, and the converter power electronics (including DC link capacitor 110, the inverters 104, the SMES 102, and grid side converter currents), where $X = f[i_{gd}, i_{gq}, \delta, \omega, \theta_z, \omega_t, V_c, i_{td}, i_{tq} I_{dc} P_{SM}, Q_{SM}]$ and $u = f[K_{pg}, K_{vg}, T_{pg}, T_{vg}]$, where u shows the SMES controller parameters. For proper function of the SMES controller these parameters need to be adaptively tuned. FIG. 5 shows grid side section 500 of the SMES 102 connected to local load 106. The modulation index $M_{SM}$ and the phase angle $\alpha_{SM}$ inputs to the SMES 102 are also shown in FIG. 1 as control input 108.

With respect to the improved particle swarm optimization (IPSO), each particle shows a candidate solution to the optimization problem. Each particle has its own direction and velocity in the search space. These movements of the particles are controlled by the best position in a search area and position a particle has visited. In this proposed improved particle swarm optimization, each particle updates its velocity and position by updating the inertia weight (w). Each particle modifies its velocity and position using the best solution among the particles achieved and gbest (global best) of neighborhood particles. It is the same instance in the social society where the better decisions could be made by the group of leaders. However, in standard PSO, only a gbest of neighborhood particles is employed. By contrast, this process uses some neighborhood particles that can be called 'intensifying' and 'enhancing' the social influence. Based on this technique, these particles should be intensified, which could lead individuals to better fitness.

For the evaluation of each particle, an eigenvalue-based objective function will be used. Initially, the population is generated stochastically and referred to as a search space.

The IPSO uses a population of N particles, which is the dimension of the search space. The position of the particle is represented as:

$$x_i(k) = [x_{i1}(k), x_{i2}(k), \ldots, x_{iN}(k)], \quad (13)$$

where k is the iteration number. By adding velocity, the position of the particles is updated by the following equation:

$$x_i(k+1) = x_i(k) + v_i(k). \quad (14)$$

Each particle has its own search space area and search experience, depending on objective function calculation. In IPSO, mainly two algorithms work, the global best (gbest) and the local best (pbest). Their calculation is dependent on cognitive and social components. The $i^{th}$ particle velocity in IPSO is calculated as:

$$v_i(k+1) = v_i(k) + c_1 \text{rand}_1(p_i(k) - x_i(k)) + c_2 \text{rand}_2(p_g(k) - x_i(k)). \quad (15)$$

The operations $\text{rand}_1$ and $\text{rand}_2$ produce random values, which are uniformly distributed random numbers in the range [0, 1], $c_1$ and $c_2$ are the acceleration constant and $p_g(k)$ is the global best position it has visited. The local best state of the particles is written as:

$$p_i(k) = [p_{i1}(k), p_{i2}(k), \ldots, p_{iN}(k)] \quad (16)$$

The local best position can be updated as:

$$p_i(k+1) = p_i(k) \text{ if } J(x_i(k+1)) \geq J(p_i(k)) \quad (17)$$

$$p_i(k+1) = x_i(k+1) \text{ if } J(x_i(k+1)) < J(p_i(k)) \quad (18)$$

The objective function J, which is to be minimized, can be calculated as:

$$J = \sum_{i=1}^{N} (\varsigma(k) - \varsigma_0)^2 \quad (19)$$

and $$\varsigma = \frac{-\sigma}{\sqrt{\sigma^2 + \gamma^2}}, \quad (20)$$

where $\varsigma_0$ is the preselected value of damping ratio, $\sigma$ and $\gamma$ are the real and imaginary parts of the eigenvalues of the linearized 12×12 matrix of equation (9). The detailed 12×12 matrix components of equation (9) are listed in Table 1. The movement of the particles is predicted by the global best position. The global position in the entire swarm can be defined as:

$$p_{gbest}(k) \in \{p_{i1}(k), p_{i2}(k), \ldots, p_{iN}(k)\} | J(p_{gbest}(k)) = \min\{p_{i1}(k), p_{i2}(k), \ldots, p_{iN}(k)\}. \quad (21)$$

The velocity of the particle in the local best is calculated as:

$$v_i(k+1) = v_i(k) + c_1 \text{rand}_1(p_i(k) - x_i(k)) + c_2 \text{rand}_2(p_{ilocal\ best}(k) - x_i(k)), \quad (22)$$

where $p_{ilocal\ best}$ is the local best position, and $p_{ilocal\ best}$ can be defined as:

$$p_{ilocal\ best}(k+1) \in \{N_i | J(p_{ilocal\ best}(k)) = \min\{J(x)\}\} \forall x \in N_i \quad (23)$$

TABLE 1

Linearized 12 × 12 matrix Eqn. (9) state matrix detail $a(1,1) = -((\omega_o X_d)/X_q)$  
$a(1,4) = ((\omega_o X_q)/X_d) i_{gqo}$  
$a(2,2) = -((\omega_o R_a)/X_q)$  
$a(2,7) = -((\omega_o m_{gco} \cos \delta_o)/X_q)$  
$a(4,2) = -(m_{gco} V_{co} \cos \delta_o + 2 i_{gqo} R_a)/X_q$  
$a(4,5) = -K_s/2H_g$ $a(5,6) = \omega_o$ $a(1,2) = -((\omega_o R_a)/X_q)$  
$a(1,7) = -((\omega_o/X_d) m_{gco} \sin \delta_o)$  
$a(2,3) = ((\omega_o m_{gco} V_{co} \sin \delta_o)/X_q)$  
$a(3,4) = \omega_o$  
$a(4,3) = -(v_{gdo} i_{gdo} - v_{gqo} i_{gqo})/2H_g$  
$a(4,7) = -(m_{gco} i_{gdo} \sin \delta_o + m_{gco} i_{gqo} \cos \delta_o)/2H_g$  
$a(6,5) = -K_s/2H_t$ $a(1,3) = -((\omega_o/X_d) m_{gco} V_{co} \cos \delta_o)$  
$a(2,1) = -((\omega_o X_d)/X_q)$  
$a(2,4) = (\omega_o (E_{rso} - X_d i_{gdo}))/X_q$  
$a(4,1) = -(m_{gco} V_{co} \sin \delta_o + 2 i_{gdo} R_a)/2H_g$  
$a(4,4) = -D_g/2H_g$  
$a(5,4) = -\omega_o$ $a(6,6) = -(D_t/2H_t)$ TABLE 1-continued Linearized 12 × 12 matrix Eqn. (9) state matrix detail

| $a(7,1) = (m_{gco} \sin \delta_o)/C$ | $a(7,2) = (m_{gco} \cos \delta_o)/C$ | $a(7,3) = (m_{gco} i_{gdo} \cos \delta_o - m_{gco} i_{gpo} \sin \delta_o)/C$ |
|---|---|---|
| $a(7,7) = \left( \begin{array}{c} m_{gco} i_{gdo} \sin \delta_o + m_{gco} i_{gqo} \cos \delta_o + \\ m_{ico} i_{ido} \cos \alpha_{ico} - m_{ico} i_{iqo} \sin \alpha_{ico} \end{array} \right) / C$ | $a(7,8) = (m_{ico} \cos \alpha_{ico})/C$ | $a(7,9) = (m_{ico} \sin \alpha_{ico})/C$ |
| $a(8,4) = T_{38}$ | $a(8,7) = T_{39}$ | $a(8,8) = T_{53}$ |
| $a(8,9) = T_{54}$ | $a(8,10) = T_{55}$ | $a(8,11) = T_{56}$ |
| $a(8,12) = T_{57}$ | $a(9,4) = T_{40}$ | $a(9,7) = T_{41}$ |
| $a(9,8) = T_{58}$ | $a(9,9) = T_{59}$ | $a(9,10) = T_{60}$ |
| $a(9,11) = T_{61}$ | $a(9,12) = T_{62}$ | $a(10,8) = T_{63}$ |
| $a(10,9) = T_{64}$ | $a(10,10) = T_{65}$ | $a(10,11) = T_{66}$ |
| $a(10,12) = T_{67}$ | $a(11,1) = -(K_{PG}(m_{gco}V_{co} \sin \delta_o + 2i_{gdo}R_a))/T_{PG}$ | $a(11,2) = -(K_{PG}(m_{gco}V_{co} \cos \delta_o + 2i_{gqo}R_a))/T_{PG}$ |
| $a(11,3) = -\left( K_{PG} \left( \begin{array}{c} m_{gco}V_{co} i_{gdo} \cos \delta_o - \\ m_{gco}V_{co} i_{gqo} \sin \delta_o \end{array} \right) \right) / T_{PG}$ | $a(11,7) = \left( K_{PG} \left( \begin{array}{c} m_{gco} i_{gdo} \sin \delta_o + \\ m_{gco} i_{gqo} \cos \delta_o \end{array} \right) \right) / T_{PG}$ | $a(11,11) = -(1/T_{PG})$ |
| $a(12,3) = -\left( K_{VG} \left( \begin{array}{c} m_{gco}V_{gdo}V_{co} \cos \delta_o + \\ m_{gco}V_{gqo}V_{co} \sin \delta_o \end{array} \right) \right) / T_{VG} V_{go}$ | $a(12,7) = \left( K_{VG} \left( \begin{array}{c} m_{gco}V_{gdo} \sin \delta_o + \\ m_{gco}V_{gqo} \cos \delta_o \end{array} \right) \right) / T_{VG} V_{go}$ | $a(12,12) = -(1/T_{VG})$ |

Exploration and exploitation of an algorithm need to be under consideration. Exploration is the ability of the algorithm to explore the entire search space. Exploitation is the ability of the algorithm to focus only on an optimum area to refine the solution. Inertia Weight plays a key role in the process of providing balance between exploration and exploitation process. The Inertia Weight determines the contribution rate of a particle's previous velocity to its velocity at the current time step. Selection of the suitable inertia weight enhances the performance and provides excellent results. The inertia weight W is shown in eqn. (24) as:

$$w = w_{max} - \left( \frac{w_{max} - w_{min}}{iter_{max}} \right) iter, \quad (24)$$

where $iter_{max}$ is the maximum number of iterations and iter is the current iteration number.

Improvement in the inertia weight helps to converge the objective function fast. The velocity equation for the gbest and local best with inertia weight can be written as:

$$v_i(k+1) = wv_i(k) + c_1 \text{rand}_1 (p_i(k) - x_i(k)) + c_2 \text{rand}_2 (p_g(k) - x_i(k)), \quad (25)$$

and $$v_i(k+1) = wv_i(k) + c_1 \text{rand}_1 (p_i(k) - x_i(k)) + c_2 \text{rand}_2 (p_{ilocal\,best}(k) - x_i(k)). \quad (26)$$

Figure 8:
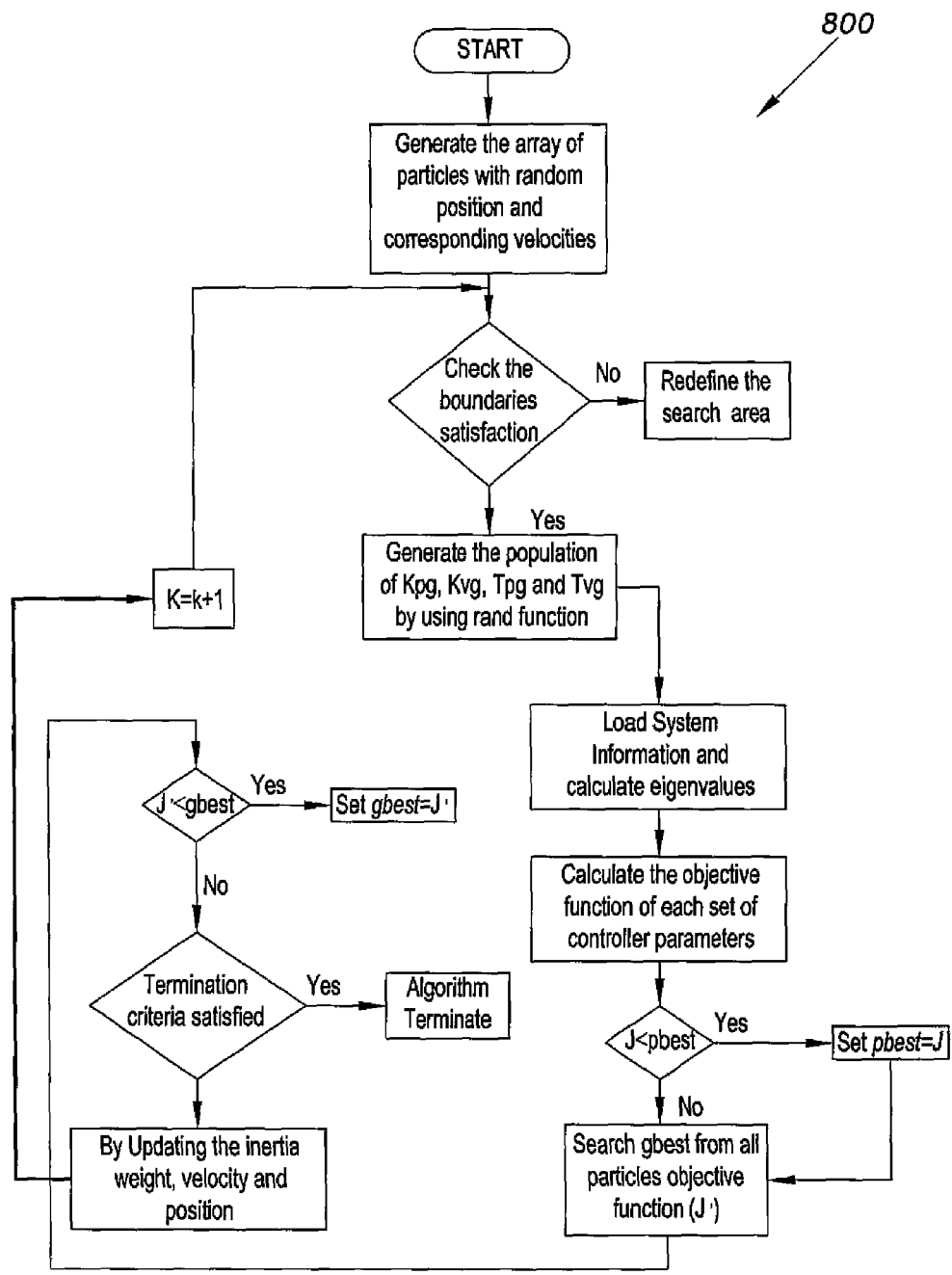
FIG. 8 is a flowchart of an ISO algorithm used in an adaptive SMES control system according to the present invention.

The major advantages of IPSO are its simplicity, lower computational complexity, and lower computational effort due to its fast convergence. Because of the fast convergence, IPSO can be used for generating training data for a neural network, optimization of a cost function, pattern recognition, scheduling assignment, and combination optimization. Steps of the IPSO algorithm flowchart 800 of FIG. 8 are outlined in Table 2.

TABLE 2

IPSO Algorithm Steps

| Step # | Process |
|---|---|
| 1 | Generate particle array with random position and corresponding velocities |
| 2 | Check boundaries satisfaction |
| 3 | If boundaries not satisfied, redefine search area |
| 4 | If boundaries satisfied, use rand function to generate population of $K_{PG}$, $K_{VG}$, $T_{PG}$, $T_{VG}$ |
| 5 | Load system information and generate eigenvalues |
| 6 | Calculate the objective function of each set of controller parameters |
| 7 | Determine whether $J < p_{best}$ |
| 8 | Yes: Set $p_{best} = J$, then continue in-line processing |
| 9 | No: Search $g_{best}$ from all particles' objective function (J') |
| 10 | Set $g_{best} = J'$ if $J' < g_{best}$ |
| 11 | If the termination criteria are satisfied, terminate the algorithm |
| 12 | If the termination criteria are not satisfied, update the inertia weight, velocity and position and repeat steps 2 through 12. |

In the following example, the parameters in equations (14) and (15) were initialized. The cognitive and social acceleration constants $c_1$ and $c_2$ were set to 2. The random numbers rand1 and rand2 were initialized by using the "rand" function in MATLAB. A sample of 100 sets of SMES controller parameters have been generated and designated as the population of the parameters. The system information is loaded, and the eigenvalues are calculated for each set of the SMES controller parameters ($K_{pg}$, $K_{vg}$, $T_{pg}$ and $T_{vg}$) from the population. From these eigenvalues, the objective function is calculated by using eqn. (19). A loop runs for 50 iterations, during which the optimized controller parameters are generated using new inertia weight, position and velocity values, based on equations (24) through (26). The updates are made to the $g_{best}$ and $p_{best}$ parameters based on the minimized value of the objective function of the particles. The example was implemented to find the global best within the iterations. The stop condition was user-defined upon consideration of the applied problem.

Generally, the stop condition could be in terms of optimized value or fixed iterations. In this scenario, the stop condition was considered to be a specific number of iterations. A set of 50 iterations provided considerably more stable predicted data than others. So, in this work, 50 iterations have been fixed. The value that satisfies the objective function from the values extracted during each iteration was selected as an optimized value. A similar procedure followed to calculate the predicted position parameter of all the particles. One such process of optimization for each of the particles is considered as one iteration. This process prepares the RBFNN training data, which is used by the RBFNN to train the network.

Figure 10:
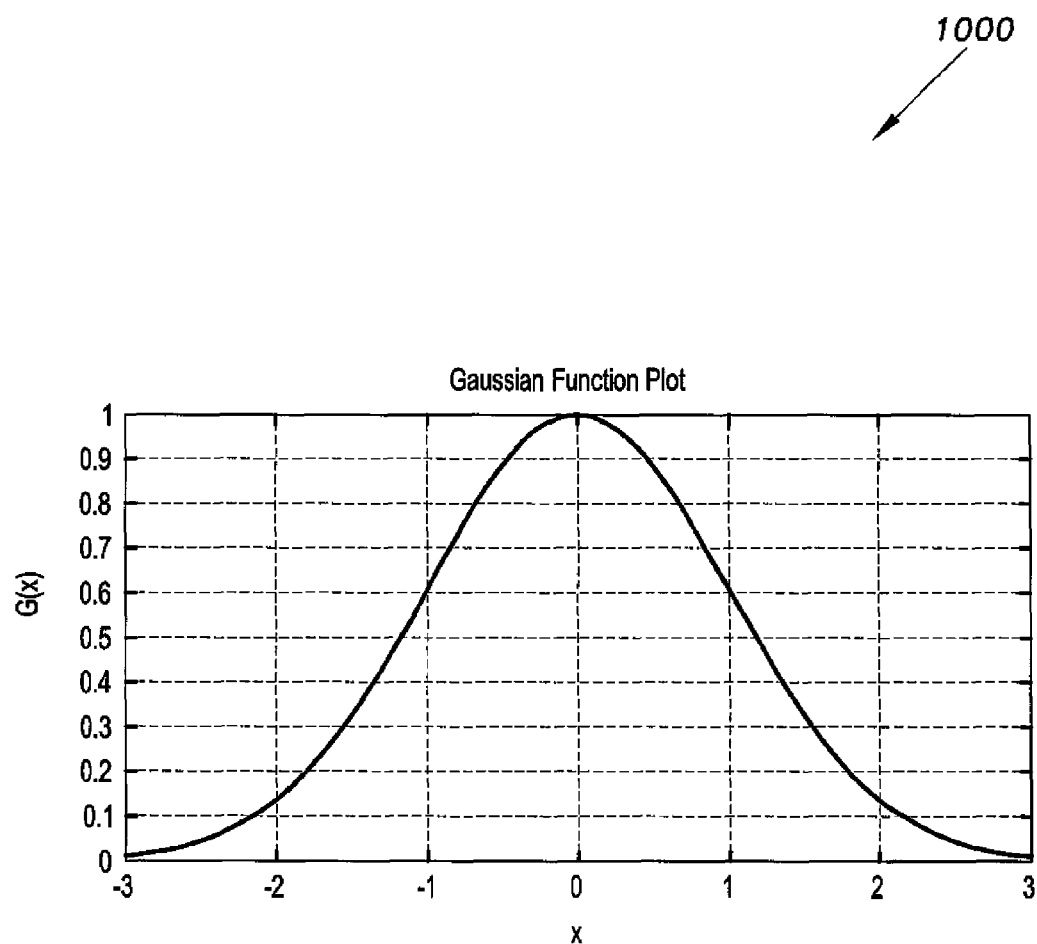
FIG. 10 is a plot showing a Gaussian function used for neuron activation used in an adaptive SMES control system according to the present invention.

The three-layer RBFNN, shown in FIG. 11, is configured so that the input units are directly connected to the hidden layer with hidden nodes. The hidden layer is fully connected, by linear combination, to the output layer via output weights. The performance of the RBFNN is controlled by three parameters, i.e., the center of the hidden units, the number of hidden units, and the RBF functions. For various types of contingencies, a trained network is needed, which identifies the SMES parameters under various contingencies. Here, an RBFNN is used for training the network. The response of the RBFNN is linear with respect to its output-connection weights. This property guarantees fast convergence. Moreover, the local tunability of the RBFNN reduces the training time and computational overhead, and makes the RBFNN a good candidate for tuning. The radial basis function neural network (RBFNN) is a feed-forward, 3-Layer network that is based on radial basis functions (such as the exemplary Gaussian function 1000, shown in FIG. 10) as their activation function. As shown in FIG. 11, this neural network includes a single hidden layer 413, which has several hidden linear units 415 connected to the output layer. Each hidden linear unit 415 calculates a nonlinear function by measuring the distance between the network input and the unit weight vector. This unit vector is usually called the center of the unit, and the distance is called the Euclidean distance. The Gaussian function is used as a basis function. This function mainly depends on two parameters, $\beta$ and c, so that:

$$\phi(\|I - c_j\|, \beta) = \exp\left(\frac{-\|I - c_j\|}{\beta_j^2}\right), \quad (27)$$

where I is the input vector, $\beta$ is the spread factor, and $c_j$ is the $j^{th}$ center. In the Gaussian function, output given by the neuron is maximum at the center and decreases when the neuron moves away from the center. A Gaussian function, such as Gaussian function 1000, is normally used for hidden neurons. If an input vector coincides with the centroid of the cluster, then the neuron representing that cluster will give the maximum output. As the distance of the input vector from the centroid of the cluster increases, the response of that cluster decreases. If the receptive fields of the neurons are overlapping, then all the neurons with overlapping fields will give output according to the distance of the vector from the cluster's centroid.

The hidden linear units 415 of the hidden layer 413 take a p-dimensional input vector $I_p$ with unit connection weights and calculate the Euclidean distance between the input vector and the center. This result passes to a Gaussian function. The hidden layer 413 maps the input space onto a new space by performing the fixed nonlinear transformation. Then the output layer performs the linear combination onto this new space by adjusting the weight matrix. In this way, the RBFNN maps the p-dimensional input space to the m-dimensional output space. Equation (28) gives the output of the RBFNN and is calculated as the weighted sum of the hidden layer outputs, as follows:

$$y_i = w_{oi} + \sum_{j=1}^{h} w_{ji} \phi(\|I - c_j\|, \beta), \quad (28)$$

where i=1, 2, 3, ..., m; j=1, 2, 3, ..., h; h shows the hidden units;

$$\|I - c_j\|$$

shows the Euclidean distance between input and the $j^{th}$ center; $\phi(\bullet)$ is the nonlinear transfer function of the radial basis function; $w_{ji}$ is the weight value between the $i^{th}$ center and $j^{th}$ output node.

With respect to training the network, using the RBFNN, the input vector (I) is directly connected to the single hidden layer 413 with h nodes. It can be observed that h is the key factor, not only for performance, but also the computational complexity of the network. For the $h^{th}$ hidden unit, $c_h$ (h=1, 2, 3, ..., h) denotes the mean vector of the $h^{th}$ cluster. The vector $c_h$ is also known as the center vector or kernel vector. The $h^{th}$ hidden unit Euclidean net function for the $p^{th}$ training pattern can be calculated as:

$$ED_p(n) = \sum_{n=1}^{N} (I_p(n) - c_h(n))^2, \quad (29)$$

where $c_h(n)$ is the $n^{th}$ element of $c_h$ corresponding to the $n^{th}$ input unit. The mean vector parameter $c_h$ and spread factor parameter $\beta$ are conventional parameters of a RBFNN. The hidden layer 413 is fully connected to the output layer via output weights. So, the output will be calculated through eqn. (28). The training mean square error ($E_p$) for each pattern can be calculated as:

$$E_p = \sum_{i=1}^{m} [o_p(i) - y(i)]^2, \quad (30)$$

where $O_p$ is the output calculated by the IPSO method and y is the output calculated by the RBFNN, and both are column vectors.

The training data set consists of training patterns $\{I_p, o_p\}$. The input data ($I_p$) is achieved by taking the values of the generator current, generator angle, generator speed, DC-link capacitor voltage, the inverter current, generator power, and terminal voltage at different operating conditions, while the controller parameters ($K_{pg}$, $K_{vg}$, $T_{pg}$ and $T_{vg}$) for a particular operating condition are saved into an output vector. The weights of the hidden layer are trained through the RBFNN algorithm. The training data of 800 sets are used in the training process.

Figure 9:
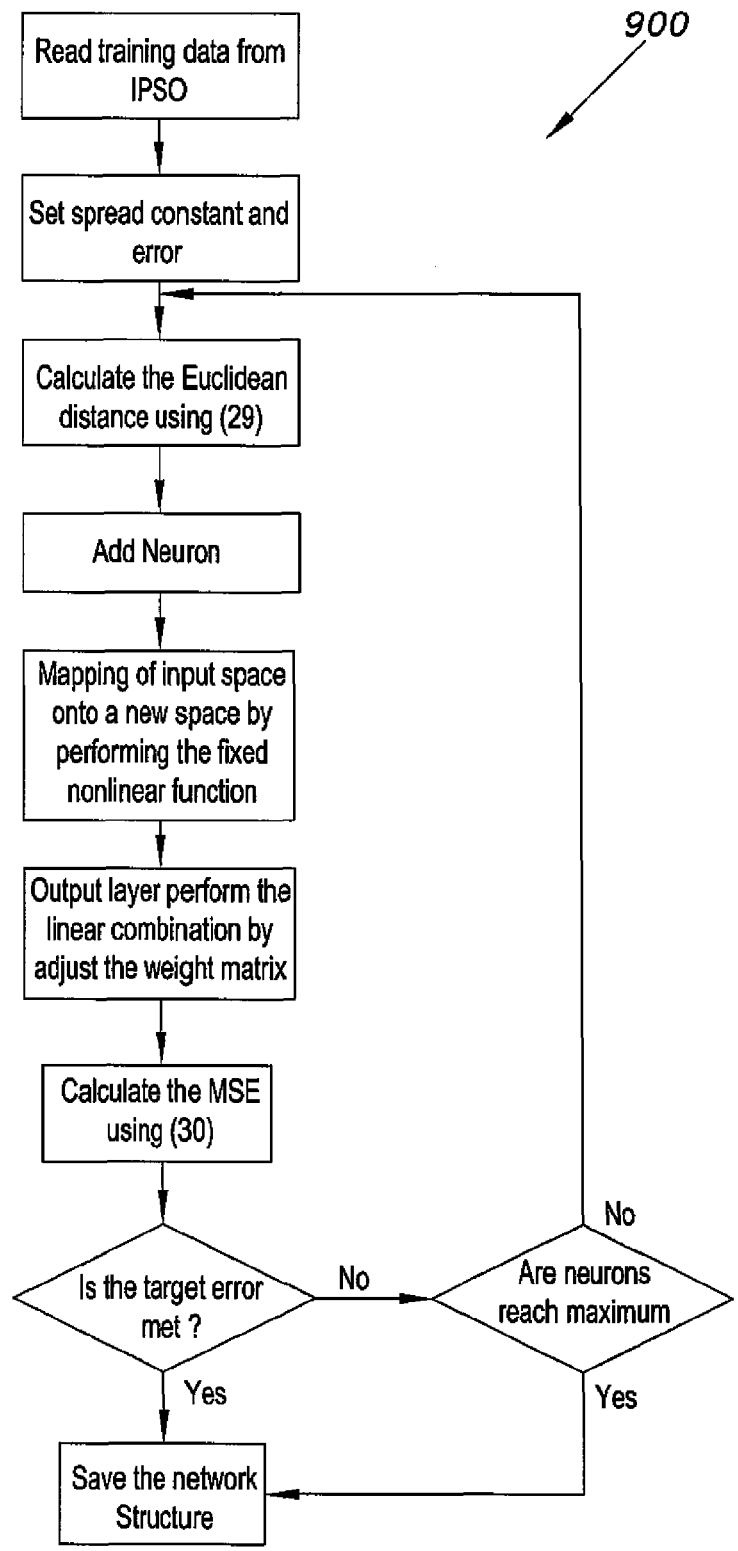
FIG. 9 is a flowchart of an RBFNN learning algorithm used in an adaptive SMES control system according to the present invention.

In the RBFNN algorithm, the spread factor β is an important parameter with respect to the input space. The spread factor β determines the width of an area in the input space to which each neuron responds. If β is 0.1, then each RBFNN hidden layer neuron will respond with 0.5 or more to any input vectors within a vector distance of 0.1 from their weight vector, the maximum response output being equal to 1. In the present method, the spread factor β is set to be 0.1. The error goal is set to be 0.02. The RBFNN is trained till an error goal of 0.02 is reached. The algorithm takes the input vector and calculates the Euclidean distance by using eqn. (29). The RBFNN algorithm adds neurons into the hidden layer and maps the input space onto a new space by performing the nonlinear Gaussian function. After calculating the nonlinear function, the output layer performs the linear combination by adjusting the weight matrix. Based on the weight matrix, a mean square error ($E_p$) of each pattern is calculated through eqn. (30). If $E_p$ is greater than the error goal, which is defined at the start of the algorithm, then add a neuron into the hidden layer and repeat the procedure from the Euclidean distance calculation. But on the other hand, if the $E_p$ is meeting the error goal, then the algorithm will be terminated by saving the network, to be recalled during simulations. This network is called the RBFNN trained network. FIG. 9 shows the flowchart 900 of the RBFNN algorithm. Steps of the IPSO algorithm flowchart 900 of FIG. 9 are outlined in Table 3.

TABLE 3

RBFNN Algorithm Steps

| Step # | Process |
|---|---|
| 1 | Read training data from IPSO |
| 2 | Set spread constant and error |
| 3 | Calculate the Euclidean distance using equation (29) |
| 4 | Add Neuron |
| 5 | Map input space onto a new space by performing the fixed nonlinear function |
| 6 | Use output layer to perform the linear combination by adjusting the weight matrix |
| 7 | Calculate the MSE using equation (30) |
| 8 | If target error is not met and if the # neurons are not maxed out, then repeat steps 3 through 8 |
| 9 | Else, save the neuron structure |

The PMSG system given in FIG. 12 was simulated to test the adaptive SMES control strategy. In the simulation, optimum output training data for the neural network was generated using the IPSO method. The radial basis function neural network (RBFNN) was trained to generate a nominal weighting function for the RBFNN controller. The controller was tested considering different contingencies.

The training data for the radial basis function neural network (RBFNN) is generated using the improved particle swarm optimization (IPSO). The IPSO finds the optimum set of SMES controller parameters for a given initial condition. The algorithm begins with the generator current, generator angle, generator speed, DC-link capacitor voltage, the inverter current, generator power, and terminal voltage as input, and generates a population of size 100 by taking the random values of SMES controller parameters ($K_{pg}$, $K_{vg}$, $T_{pg}$ and $T_{vg}$). The IPSO algorithm sets the minimum and maximum values of the SMES controller parameters as:

$$-30 \leq K_{PG} \leq 30$$

$$-30 \leq K_{VG} \leq 30$$

$$0.001 \leq T_{PG} \leq 1$$

$$0.001 \leq T_{VG} \leq 1. \quad (31)$$

The IPSO tries to find the optimum values of the SMES controller parameters within the above ranges.

Figure 13:
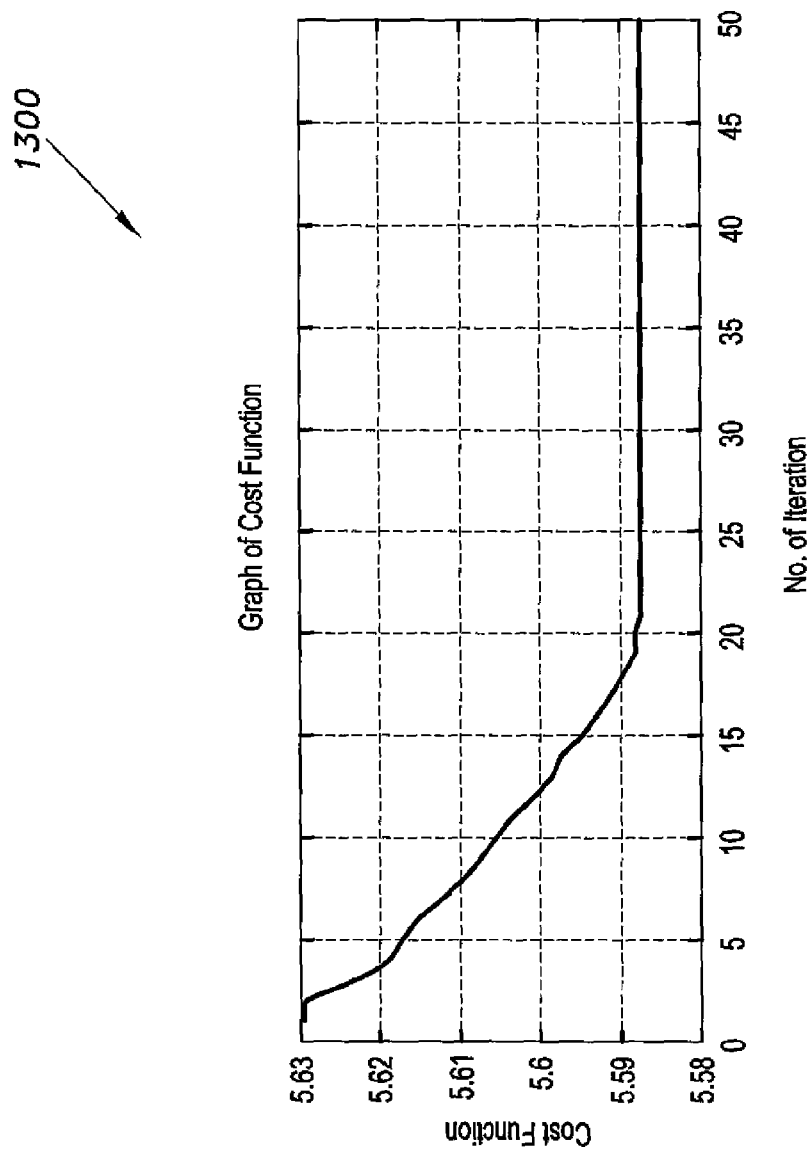
FIG. 13 is a plot showing the cost as a function of iterations in an adaptive SMES control system according to the present invention.

The SMES controller parameters were optimized using IPSO, which made use of an eigenvalue-based objective function to obtain the optimized parameters. The objective function to be minimized is equation (19). For a torque pulse of 20% for 0.3 sec, plot 1300 of FIG. 13 shows the convergence characteristic of the IPSO objective function (J) for one step size of simulation time. The IPSO converges the objective function to the optimum value in 22 iterations. The optimized SMES controller parameters for one step size of simulation time for 20% torque pulse are given in Table 4.

TABLE 4

Optimum SMES controller parameters

| Disturbance | $K_{pg}$ | $K_{vg}$ | $T_{pg}$ | $T_{vg}$ |
|---|---|---|---|---|
| Torque pulse of 20% for 0.3 sec | 3.75 | 9.25 | 0.2001 | 0.23 |

The eigenvalues of the system shown in FIG. 12, without any control and with the present SMES control under a rated wind speed of V=9 m/s for one step size of simulation time are listed in Table 5. The eigenvalues $E_1$-$E_5$ listed in Table 5 are related to the PMSG system without a SMES, whereas the eigenvalues $E_6$-$E_8$ refer to the PMSG with the present SMES control unit. An examination of the eigenvalues listed in Table 5 reveals that the eigenvalues $E_1$ and $E_2$ are almost fixed on the complex plane. The system without the SMES unit has eigenvalue $E_4$, which is close to the imaginary axis of the complex plane. The damping of $E_3$-$E_5$ is improved when the present SMES control system is included in the wind system.

TABLE 5

Eigenvalues for the system of FIG. 12

| Eigenvalues | PMSG Without Control | PMSG With SMES |
|---|---|---|
| $E_1$ | −530.8766 ± j1063.1562 | −530.8766 ± |
| $E_2$ | −4.6210 ± j377.3165 | −4.6210 ± j377.2155 |
| $E_3$ | −0.5778 ± j27.6791 | −4.8112 ± j25.6013 |
| $E_4$ | −0.0998 ± j4.0035 | −0.7948 ± j13.8378 |
| $E_5$ | −1.0095 | −1.0206 |
| $E_6$ | — | −10.1237 |
| $E_7$ | — | −9.9999 |
| $E_8$ | — | −0.5131 |

Figure 14:
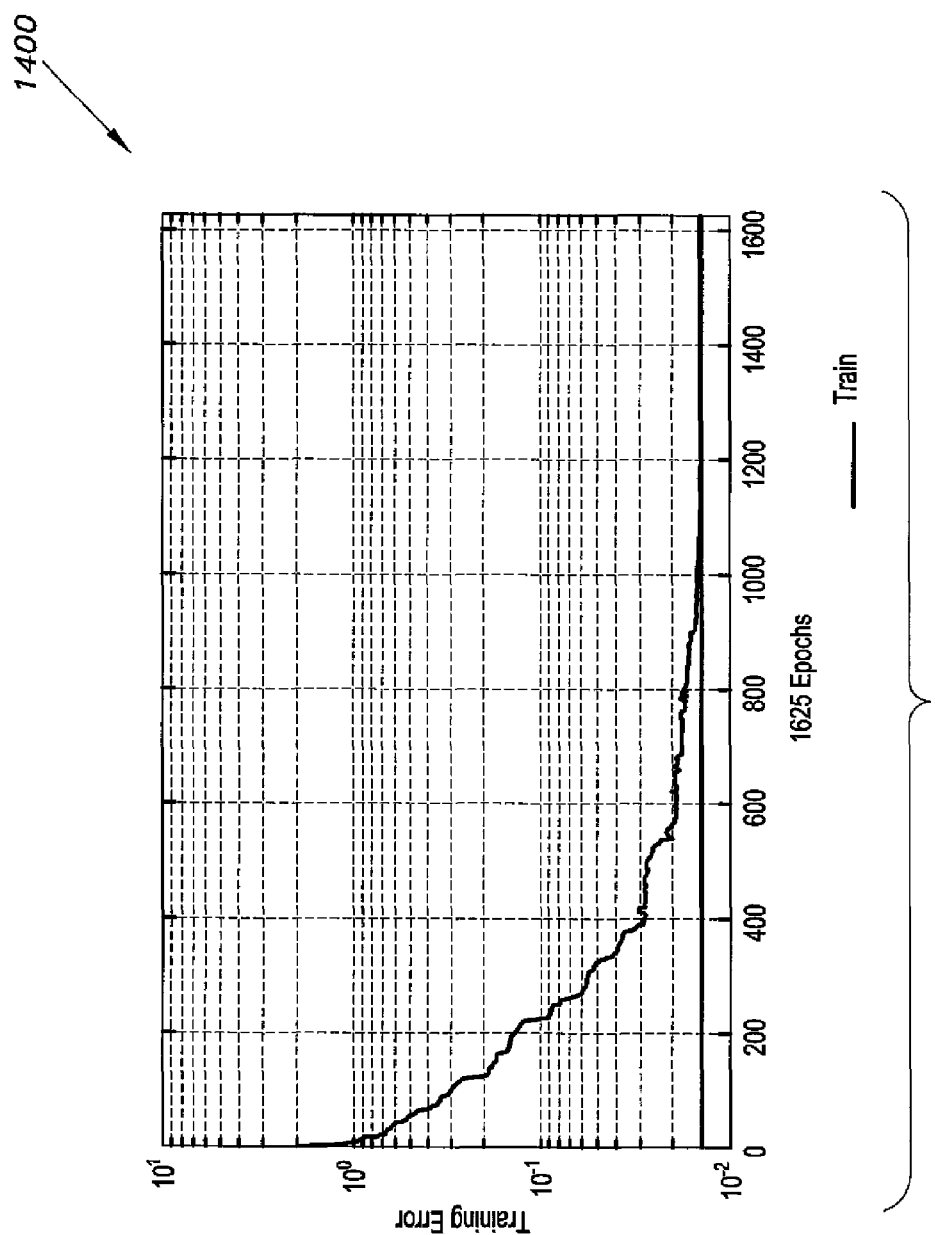
FIG. 14 is a plot showing MSE convergence of RBFNN according to the present invention.

The results of the IPSO algorithm were used to train the radial basis function neural network (RBFNN). The input vector contains generator current, generator angle, generator speed, DC-link capacitor voltage, the inverter current, generator power, and terminal voltage, while the SMES controller parameters ($K_{pg}$, $K_{vg}$, $T_{pg}$ and $T_{vg}$) are the outputs. In this learning process, a collection of desired input-output pairs are used for the RBFNN to learn. For the learning phase, 800 input-output data sets were obtained. For online tuning using the RBFNN, the centers and network weights are updated at each iteration. Initial centers, which have been generated randomly in the input domain, are updated based upon how far the current input vector is away from the last updated centers (Euclidean distance). After calculating the Euclidean distance, the nonlinear function (Gaussian function) is updated. The outputs of the hidden layer can be calculated by updating the weight matrix. The mean squared error (MSE) of the RBFNN is calculated using equation (30). The MSE is set to 0.02 in this work. The training process continues until the targeted error is met, as shown in plot 1400 of FIG. 14. The training error converges in about 1625 epochs.

Figure 15:
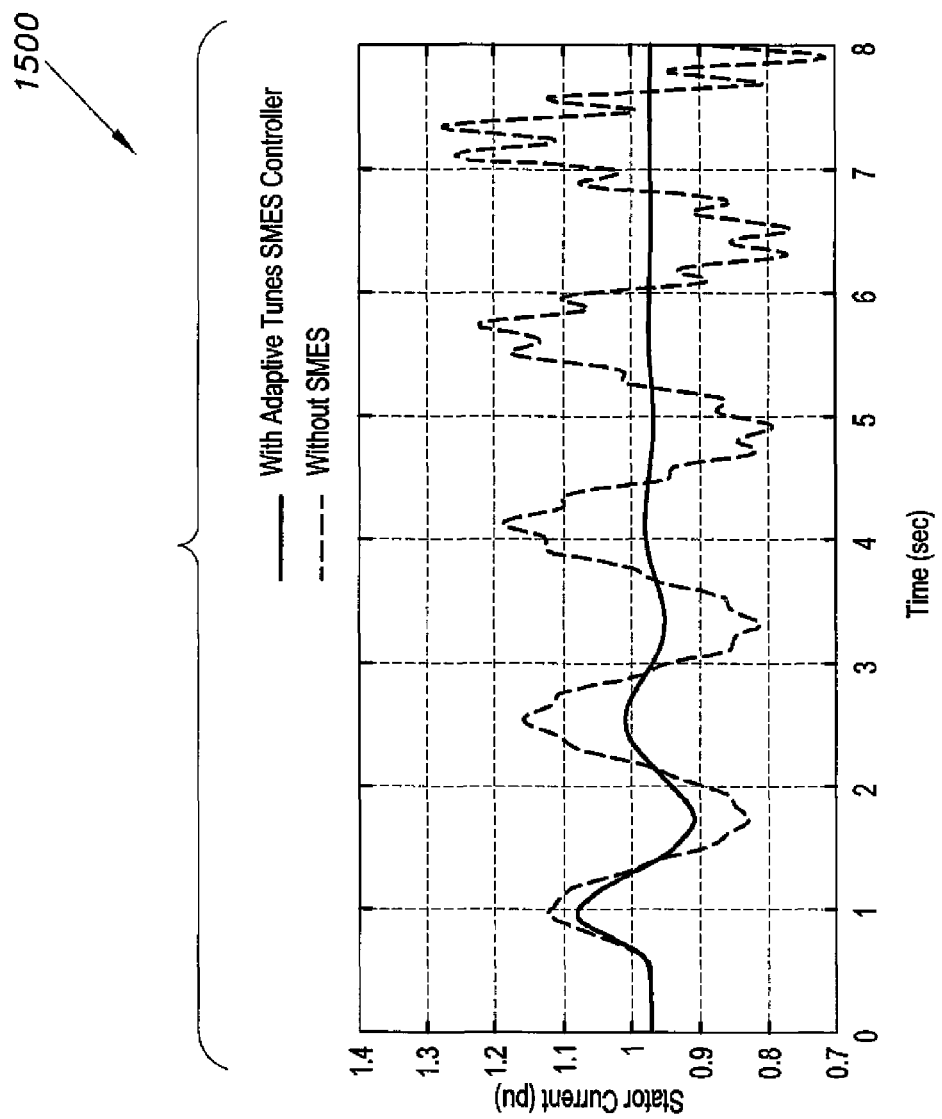
FIG. 15 is a plot showing difference between an adaptive-tuned SMES controller and no SMES.

The present adaptive SMES control method and system was tested through simulations of different disturbances on the PMSG system. The disturbances considered were torque pulses of various magnitudes and duration (input torque pulse of 20% for 0.3 sec; input torque pulse of 10% for 2 sec.), a low voltage condition on the grid simulated through symmetrical 3-phase fault, and wind gust. All performed satisfactorily. The Torque pulse results are shown in plot 1500 of FIG. 15. It can be seen that the SMES adaptive controller provides good damping to the generator so that transient oscillations have been effectively suppressed within 5 seconds.

It is to be understood that the present invention is not limited to the embodiments described above, but encompasses any and all embodiments within the scope of the following claims.

We claim:

1. In a wind turbine electrical power generator system that includes a superconductive magnetic energy storage (SMES) device, a SMES controller, and a neural network executing on a processor connected to the SMES controller, an adaptive superconductive magnetic energy storage (SMES) control method, comprising the steps of:

comparing a power generator reference power and voltage signal with a measured power and voltage signal from the electrical power generator system in order to generate a reference error signal based on any differences between the reference and the measured signals;

transmitting the reference error signal to an input of the SMES controller;

the SMES controller, responsive to the reference error signal, commanding the SMES device to change its real power contribution, $\Delta P_{SM}$, and its reactive power contribution, $\Delta Q_{SM}$, to the power generator system;

sending signals from the neural network to the SMES controller to adaptively adjust gain and time constant controller parameters, $K_{pg}$, $K_{vg}$, $T_{pg}$, $T_{vg}$ of the SMES controller, where $K_{pg}$ is SMES controller gain (generator real power), $K_{vg}$ is SMES controller gain (generator real voltage), $T_{pg}$ is SMES controller time response (generator real power) and $T_{vg}$ is SMES controller time response (generator real voltage);

generating starting weights for the neural network; and adaptively and iteratively adjusting the neural network weights responsive to error signals generated from differences between output power of the power generator system and the power generator reference power.

2. The adaptive SMES control method according to claim 1, wherein the step of commanding the SMES device to change its real power contribution and its reactive power contribution to the SMES device further comprises the step of formulating the real power and reactive power commands as a modulation index value and a phase angle value computed from demand for real power and demand for reactive power, the modulation index and the phase angle values controlling a power converter of the SMES device.

3. The adaptive SMES control method according to claim 1, wherein the neural network is a radial basis function neural network (RBFNN) and the wind turbine electrical power generator system includes a permanent magnet synchronous generator (PMSG).

4. The adaptive SMES control method according to claim 3, wherein said step of generating starting weights further comprises the steps of:

executing an improved particle swarm optimization (IPSO) procedure IPSO to train the RBFNN from input-output training data created by the IPSO procedure; and generating the starting weights thereafter.

5. The adaptive SMES control method according to claim 4, wherein said step of executing the IPSO procedure further comprises the steps of:

generating a particle array having random position and corresponding velocities;

redefining a search area if boundaries are not satisfied;

randomly generating a population of the controller parameters $K_{pg}$, $K_{vg}$, $T_{pg}$, $T_{vg}$;

loading system information to generate eigenvalues;

calculating an objective function of each set of the controller parameters;

setting a current local value of the objective function to a local best value of the objective function when the current local value is less than a previous local best value of the objective function;

setting a current global value of the objective function for all particles to a global best value of the objective function for all particles when the current global value is less than a previous global best value of the objective function;

updating an inertia weight, velocity and position of the particles and continuing the particle search if termination criteria have not been satisfied; and terminating the IPSO procedure if the termination criteria have been satisfied.

6. The adaptive SMES control method according to claim 4, wherein said step of sending signals from the neural network to the SMES controller further comprises the steps of:

(a) reading training data resulting from the IPSO procedure;

(b) setting a spread constant and error;

(c) calculating an Euclidean distance as:

$$ED_p(n) = \sum_{n=1}^{N} (I_p(n) - c_h(n))^2,$$

where $ED_p(n)$ is an $h^{th}$ hidden unit Euclidean net function for the $p^{th}$ training pattern, $c_h(n)$ is the $n^{th}$ element of $c_h$ corresponding to an $n^{th}$ input unit, the training data set consisting of training patterns $I_p$, a mean vector parameter $c_h$, and spread factor parameter $\beta$;

(d) adding an artificial neuron to the RBFNN;

(e) mapping an input space onto a new space by performing a fixed nonlinear function;

(f) using an output layer of the RBFNN to perform a linear combination by adjusting a matrix that includes RBFNN weights;

(g) calculating a mean square error (MSE) as:

$$E_p = \sum_{i=1}^{m} [o_p(i) - y(i)]^2$$

where $o_p$ is the output calculated by the IPSO procedure and y is the output calculated by the RBFNN, and both are column vectors;

repeating steps (a) through (g) until a target error is met and when the current number of neurons is less than a predetermined maximum number of neurons of the neural network; and saving structure of the RBFNN.

7. The adaptive SMES control method according to claim 6, further comprising the step of computing the objective function based on eigenvalues of a linearized state equation of the wind turbine electrical power generator system.

8. The adaptive SMES control method according to claim 7, wherein said step of computing the objective function comprises the steps of:

computing an objective equation as:

$$J = \sum_{i=1}^{N} (\varsigma(k) - \varsigma_0)^2,$$

and $$\varsigma = -\sigma / \sqrt{\sigma^2 + \gamma^2},$$

where $\varsigma_0$ is the preselected value of the damping ratio, and $\sigma$ and $\gamma$ are the real and imaginary parts of the eigenvalues of the linearized state equation.

9. A wind turbine electrical power generator system, comprising:

a wind turbine electrical power generator;

a superconductive magnetic energy storage (SMES) device operably connected to the wind turbine electrical power generator;

a SMES controller operably connected to the SMES device;

a processor operably connected to the SMES controller, the processor having means for operating a neural network, the neural network including means for adaptively adjusting gain and time constant controller parameters, $K_{pg}$, $K_{vg}$, $T_{pg}$, $T_{vg}$ of the SMES controller, where $K_{pg}$ is SMES controller gain (generator real power), $K_{vg}$ is SMES controller gain (generator real voltage), $T_{pg}$ is SMES controller time response (generator real power) and $T_{vg}$ is SMES controller time response (generator real voltage);

means for comparing a power generator reference power and voltage signal with a measured power and voltage signal from the wind turbine electrical power generator system in order to generate a reference error signal based on any differences between the reference and the measured signals;

means for transmitting the reference error signal to an input of the SMES controller;

means for commanding the SMES device to change its real power contribution, $\Delta P_{SM}$, and its reactive power contribution, $\Delta Q_{SM}$, to the power generator system responsive to the reference error signal;

means for generating starting weights for the neural network; and means for adaptively adjusting the neural network weights responsive to error signals generated from differences between output power of the power generator system and the power generator reference power.

10. The wind turbine electrical power generator system according to claim 9, further comprising means for formulating the real power and reactive power commands as a modulation index value and a phase angle value computed from demand for real power and demand for reactive power, the modulation index and the phase angle values controlling a power converter of the SMES device.

11. The wind turbine electrical power generator system according to claim 9, wherein said neural network is a radial basis function neural network (RBFNN) and said wind turbine electrical power generator system includes a permanent magnet synchronous generator (PMSG).

12. The wind turbine electrical power generator system according to claim 11, wherein said means for generating starting weights further comprises means for executing an improved particle swarm optimization (IPSO) procedure to train the RBFNN from input-output training data created by the IPSO procedure, the starting weights being generated thereafter.

13. The wind turbine electrical power generator system according to claim 12, wherein means for executing an improved particle swarm optimization (IPSO) procedure further comprises:

means for generating a particle array having random position and corresponding velocities;

means for redefining a search area if boundaries are not satisfied;

means for randomly generating a population of the controller parameters $K_{pg}$, $K_{vg}$, $T_{pg}$, $T_{vg}$;

means for loading system information to generate eigenvalues;

means for calculating an objective function of each set of the controller parameters;

means for setting a current local value of the objective function to a local best value of the objective function if the current local value is less than a previous local best value of the objective function;

means for setting a current global value of the objective function for all particles to a global best value of the objective function for all particles if the current global value is less than a previous global best value of the objective function;

means for updating an inertia weight, velocity and position of the particles and continuing the particle search if termination criteria have not been satisfied; and means for terminating the IPSO procedure if the termination criteria have been satisfied.

14. The wind turbine electrical power generator system according to claim 13, wherein said neural network further comprises:

means for reading training data resulting from the IPSO procedure;

means for setting a spread constant and error;

means for calculating an Euclidean distance as:

$$ED_P(n) = \sum_{n=1}^{N} (I_p(n) - c_h(n))^2,$$

where $ED_p(n)$ is an $h^{th}$ hidden unit Euclidean net function for the $p^{th}$ training pattern, $c_h(n)$ is the $n^{th}$ element of $c_h$ corresponding to an $n^{th}$ input unit, the training data set consisting of training patterns $I_p$, a mean vector parameter $c_h$, and spread factor parameter $\beta$;

means for adding an artificial neuron to the RBFNN;

means for mapping an input space onto a new space by performing a fixed nonlinear function;

means for using output layer of the RBFNN to perform a linear combination by adjusting a matrix that includes RBFNN weights;

means for calculating a mean square error (MSE) as:

$$E_p = \sum_{i=1}^{m} [o_p(i) - y(i)]^2$$

where $o_p$ is the output calculated by the IPSO procedure and y is the output calculated by the RBFNN, and both are column vectors; and means for saving structure of the RBFNN.

15. The wind turbine electrical power generator system according to claim 13, wherein said objective computation means further comprises means for computing the objective function based on eigenvalues of a linearized state equation of the wind turbine electrical power generator system.

16. The wind turbine electrical power generator system according to claim 15, wherein said objective function computation means comprises:

means for computing an objective equation as:

$$J = \sum_{i=1}^{N} (\varsigma(k) - \varsigma_0)^2,$$

and $$\varsigma = -\sigma / \sqrt{\sigma^2 + \gamma^2},$$

where $\varsigma_0$ is the preselected value of the damping ratio, and $\sigma$ and $\gamma$ are the real and imaginary parts of the eigenvalues of the linearized state equation.

* * * * *